United States Patent
Mei et al.

(10) Patent No.: US 7,710,701 B1
(45) Date of Patent: May 4, 2010

(54) SYSTEM AND METHOD FOR PROVIDING A PROCESS, TEMPERATURE AND OVER-DRIVE INVARIANT OVER-CURRENT PROTECTION CIRCUIT

(75) Inventors: Tawen Mei, Mountain View, CA (US); Chunping Song, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/784,766

(22) Filed: Apr. 9, 2007

(51) Int. Cl.
*H02H 3/08* (2006.01)
(52) U.S. Cl. .................................. 361/93.1; 361/57
(58) Field of Classification Search ............. 361/56, 361/57, 91.2, 93.1
See application file for complete search history.

(56) References Cited

U.S. PATENT DOCUMENTS

| | | | |
|---|---|---|---|
| 4,553,084 A * | 11/1985 | Wrathall | 323/316 |
| 5,079,456 A | 1/1992 | Kotowski et al. | |
| 5,084,668 A | 1/1992 | Kotowski et al. | |
| 5,272,392 A * | 12/1993 | Wong et al. | 327/109 |
| 5,559,659 A * | 9/1996 | Strauss | 361/56 |
| 5,646,520 A | 7/1997 | Frank et al. | |
| 5,917,319 A | 6/1999 | Frank et al. | |
| 6,304,108 B1 | 10/2001 | Inn | |
| 6,347,028 B1 * | 2/2002 | Hausman et al. | 361/93.1 |
| 6,507,227 B2 * | 1/2003 | Genova et al. | 327/109 |
| 6,600,362 B1 | 7/2003 | Gavrila | |
| 6,603,358 B2 * | 8/2003 | Shearon et al. | 330/288 |
| 6,727,745 B2 | 4/2004 | Shearon et al. | |
| 7,498,794 B1 | 3/2009 | Mei et al. | |
| 2002/0089315 A1 * | 7/2002 | Shi et al. | 323/267 |
| 2005/0013079 A1 * | 1/2005 | Mitsuda | 361/100 |

OTHER PUBLICATIONS

Paul Horowitz, The Art of Electronics, 2006, The Press Syndicate of the University of Cambridge, Second Edition, 98-102.*
S Yuvarajan et al., "Performance Analysis and Signal Processing in a Current Sensing Power MOSFET (SENSEFET)", 1991 IEEE, pp. 1445-1450.
D.A. Grant et al., "Current Sensing MOSFETS for Protection and Control", 5 pages.
Marco Bildgen, "From Standard to Intelligent MOSFET", Jan. 1992 IEEE, pp. 1212-1217.
S. Yuvarajan et al., "Power Conversion and Control Using A Current Sensing Power MOSFET", 1992 IEEE, pp. 166-169.

* cited by examiner

*Primary Examiner*—Stephen W Jackson
*Assistant Examiner*—Tien Mai

(57) ABSTRACT

A system and method are disclosed for providing a process, temperature and over-drive invariant over-current protection circuit. The over-current protection circuit comprises a power transistor, a sense transistor, at least one current sense transistor and at least one current reference transistor. The over-current protection circuit provides a current limit trip value that remains substantially constant over temperature variations, and over-drive voltage variations, and process variations.

19 Claims, 3 Drawing Sheets

SYSTEM AND METHOD FOR PROVIDING A PROCESS, TEMPERATURE AND OVER-DRIVE INVARIANT OVER-CURRENT PROTECTION CIRCUIT

TECHNICAL FIELD OF THE INVENTION

The system and method of the present invention is generally directed to the manufacture of integrated circuits and, in particular, to a system and method for providing a process, temperature and over-drive invariant over-current protection circuit.

BACKGROUND OF THE INVENTION

The design of a typical power supply circuit may be characterized as a voltage regulation problem. Experienced circuit designers recognize, however, that the task of designing an efficient power supply circuit requires that the issues of current measurement and current control be considered. One of the most important reasons for monitoring current in a power supply circuit is to be able to provide current limit or over-load protection for the power supply circuit.

In prior art circuits the current limit function is normally placed inside power integrated circuit (IC) chips in order to save external board area and to reduce the cost of manufacturing the power supply circuit. In the case of switching regulators (which include power switches inside the IC chip) the over-load protection is usually implemented inside the IC chip by sensing the current through power switching and then comparing the sensed signal with a reference signal to determine whether the power supply is in an over-load condition.

Because components outside of the IC chip have no control of the current limit, it is a very important and challenging task to be able to keep the accuracy of over-load protection during variations of operating conditions such as process, temperature and over-drive voltage variations. It would be desirable to have a current sense and current limit circuit that could guarantee an overall performance of over-load protection under variable operating conditions.

FIG. 1 illustrates a schematic diagram of a prior art current sense and current limit circuit 100. Circuit 100 comprises a level shifter 110 having an output connected to the input of a driver 120 as shown in FIG. 1. Level shifter 110 receives an input signal from an IN node. Level shifter 110 and driver 120 both receive a CBOOT signal from a CBOOT node. Level shifter 110 and driver 120 both receive an SW signal from a SW node.

The output of driver 120 is connected to the gate of an n-channel transistor 130 (designated M1) and to the gate of an n-channel transistor 140 (designated M2). Transistor 130 M1 is a high-side Power Field Effect Transistor (FET). Transistor 130 M1 is sometimes referred to as power transistor 130 M1. Transistor 140 M2 is a sense Field Effect Transistor (FET) that has a much smaller size than Transistor 130 M1. For example, a typical width of transistor 130 M1 is ten thousand microns (10K µ) and a typical width of transistor 140 M2 is ten microns (10µ). Resistor 150 (designated R1) is a current sense resistor. Resistor 160 (designated R3) is a current reference resistor. Typical values of resistance for resistor 150 R1 and for resistor 160 R3 are in the range of one thousand ohms (1 kΩ) to ten thousand ohms (10 kΩ).

As shown in FIG. 1, the drain of transistor 130 M1 is connected to a first end of current sense resistor 150 R1 and to a first end of current reference resistor 160 R3 and to the input voltage node VIN that supplies the input voltage $V_{IN}$. The source of transistor 130 M1 is connected to the SW node. The drain of transistor 140 M2 is connected to a second end of the current sense resistor 150 R1 and to a sense "drain to source voltage" node (designated "VDS sen" in FIG. 1). The source of transistor 140 M2 is connected to the SW node.

The second end of the current reference resistor R3 is connected to a reference "drain to source voltage" node (designated "VDS ref" in FIG. 1). The second end of the current reference resistor R3 is also connected to a first side of a current source 170 (designated I1). The second side of the current source 170 I1 is connected to ground.

When the input signal IN is high, transistor 130 M1 and transistor 140 M2 are fully turned on and both of them are operating in the triode region. The voltage drop across the drain and source of transistor 130 M1 (designated $V_{DS1}$) is given by the expression:

$$V_{DS1} \cong I_O R_{DSON1} \qquad \text{Eq. (1)}$$

In Equation (1) the expression $I_O$ represents the load current and the expression $R_{DSON1}$ represents the drain to source resistance of transistor 130 M1.

The voltage drop $V_{R1}$ across the current sense resistor 150 R1 is given by the expressions:

$$V_{R1} = V_{IN} - V_{VDS\,sen} \qquad \text{Eq. (2)}$$

$$V_{R1} = V_{DS1} \frac{R1}{R1 + R_{DSON2}} \qquad \text{Eq. (3)}$$

$$V_{R1} = I_O R_{DSON1} \frac{R1}{R1 + R_{DSON2}} \qquad \text{Eq. (4)}$$

The expression $V_{VDSsen}$ represents the reference drain to source voltage on the drain of transistor 140 M2. The expression $V_{DS1}$ represents the drain to source voltage of transistor 130 M1. The expression $R_{DSON2}$ represents the drain to source resistance of transistor 140 M2. From Equation (4) one can see that the voltage drop $V_{R1}$ is proportional to the value of the load current $I_O$.

The reference current passes through current reference resistor 160 R3. The current reference resistor 160 R3 sets the current limit trip value. When the voltage drop across the current sense resistor 150 R1 is greater than the voltage drop across the current reference resistor R3, then the voltage on the VDSsen node will be lower than the voltage on the VDSref node. The voltage on the VDSsen node and the voltage on the VDSref node are provided to the inputs of a current limit comparator circuit (not shown in FIG. 1). When the voltage on the VDSsen node is lower than the voltage on the VDSref node then the current limit comparator will be triggered and the output of the current limit comparator will go high to flag this fault condition.

The current limit will be tripped when the voltage drop across the current sense resistor 150 R1 is equal to the voltage drop across the current reference resistor 160 R3. This equality condition is expressed as:

$$V_{R1} = V_{R3} \qquad \text{Eq. (5)}$$

The equality condition leads to the result:

$$I_O \, R_{DSON1} \frac{R1}{R1 + R_{DSON2}} = I_{REF} \, R3 \qquad \text{Eq. (6)}$$

The limit value $I_{O(LIMIT)}$ of the load current $I_O$ is:

$$I_{O(LIMIT)} = I_{REF} \frac{R3}{R1} \frac{(R1 + R_{DSON2})}{R_{DSON1}} \qquad \text{Eq. (7)}$$

From Equation (7) it would seem that in order to guarantee that the current trip value keeps constant over input voltage ($V_{IN}$) variations, temperature variations, and process variations, then the current sense resistor 150 R1, and the current reference resistor 160 R3, and the resistors $R_{DSON1}$ and $R_{DSON2}$ should be the same type of resistors and match over a wide range (assuming that the reference current $I_{REF}$ has a zero temperature coefficient).

In reality this requirement cannot be met because all of the underlying requirements cannot be simultaneously satisfied. The mismatch of the resistors causes the current limit trip value to vary widely over the input voltage ($V_{IN}$) variations, and the temperature variations, and the process variations.

FIG. 2 illustrates simulation results for the prior art current sense and current limit circuit 100 over temperature for a range of different over-drive voltages for an ideal current limit of four amperes (4.0 A). As shown in FIG. 2, the temperature ranges from minus forty degrees Celsius (−40° C.) to a positive one hundred degrees Celsius (+140° C.). The current range is from three amperes (3.0 A) to six amperes (6.0 A).

The variation of the current limit trip value as a function of temperature for an overdrive voltage of four volts (4.0 V) is shown in curve 210. The variation of the current limit trip value as a function of temperature for an overdrive voltage of five volts (5.0 V) is shown in curve 220. The variation of the current limit trip value as a function of temperature for an overdrive voltage of six volts (6.0 V) is shown in curve 230.

The results illustrated in FIG. 2 show that there is a variation of over sixty percent (60%) in the current limit trip value. This is even without the process variations being considered. It would be very difficult for a designer of power supply circuitry to design an efficient power supply circuit when faced with such wide variations in the current limit trip value.

Therefore, there is a need in the art for a system and method that is capable of solving the poor performance problems that are exhibited by prior art devices. In particular, there is a need in the art for a system and method for providing an efficient process, temperature and over-drive invariant over-current protection circuit.

The present invention provides an over-current protection circuit that comprises a power transistor, a sense transistor, at least one current sense transistor and at least one current reference transistor. The over-current protection circuit provides a current limit trip value that remains substantially constant over temperature variations, and over-drive voltage variations, and process variations.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 3:
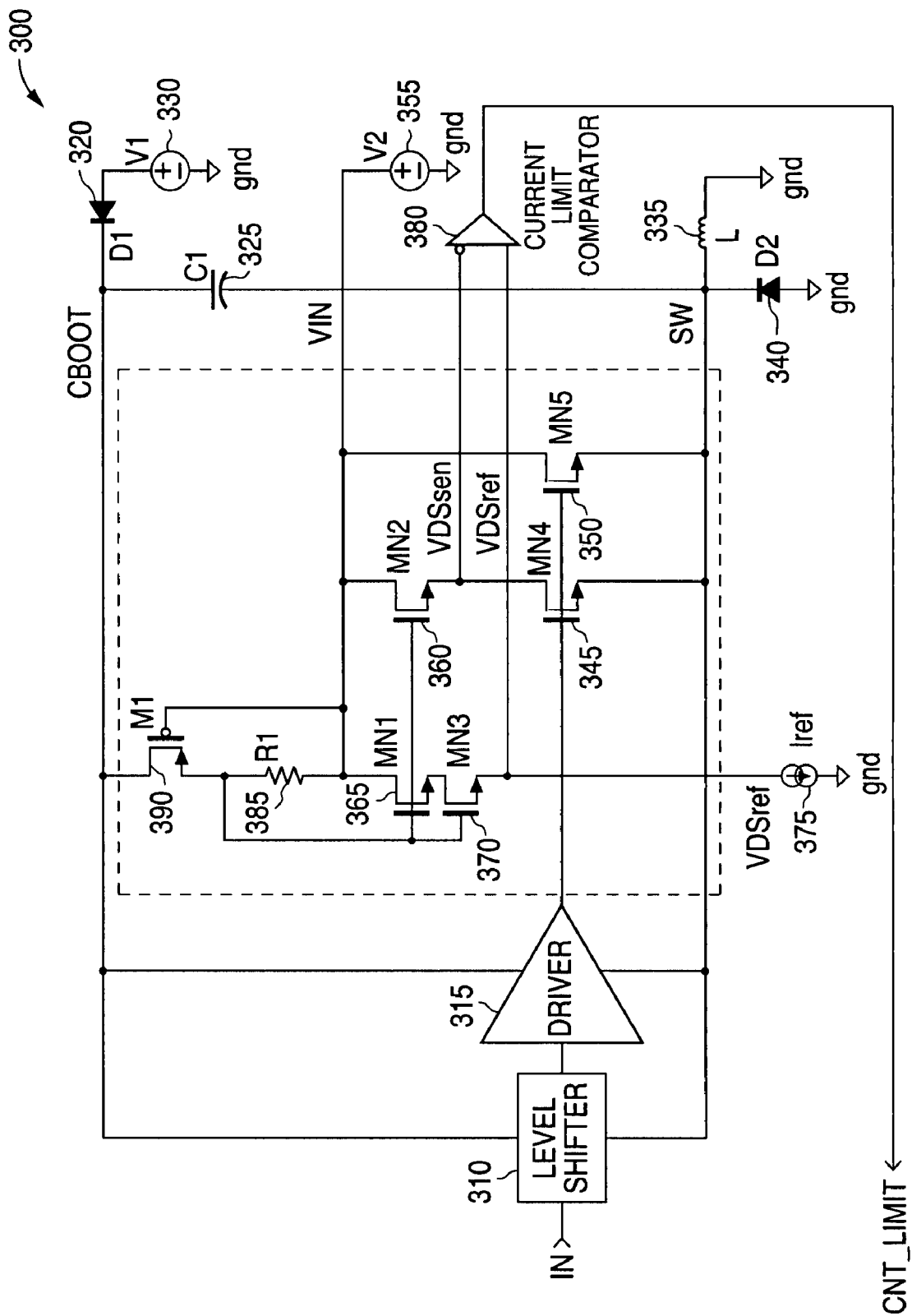
FIG. 3 illustrates a schematic diagram of a current sense and current limit circuit of the present invention.
Figure 4:
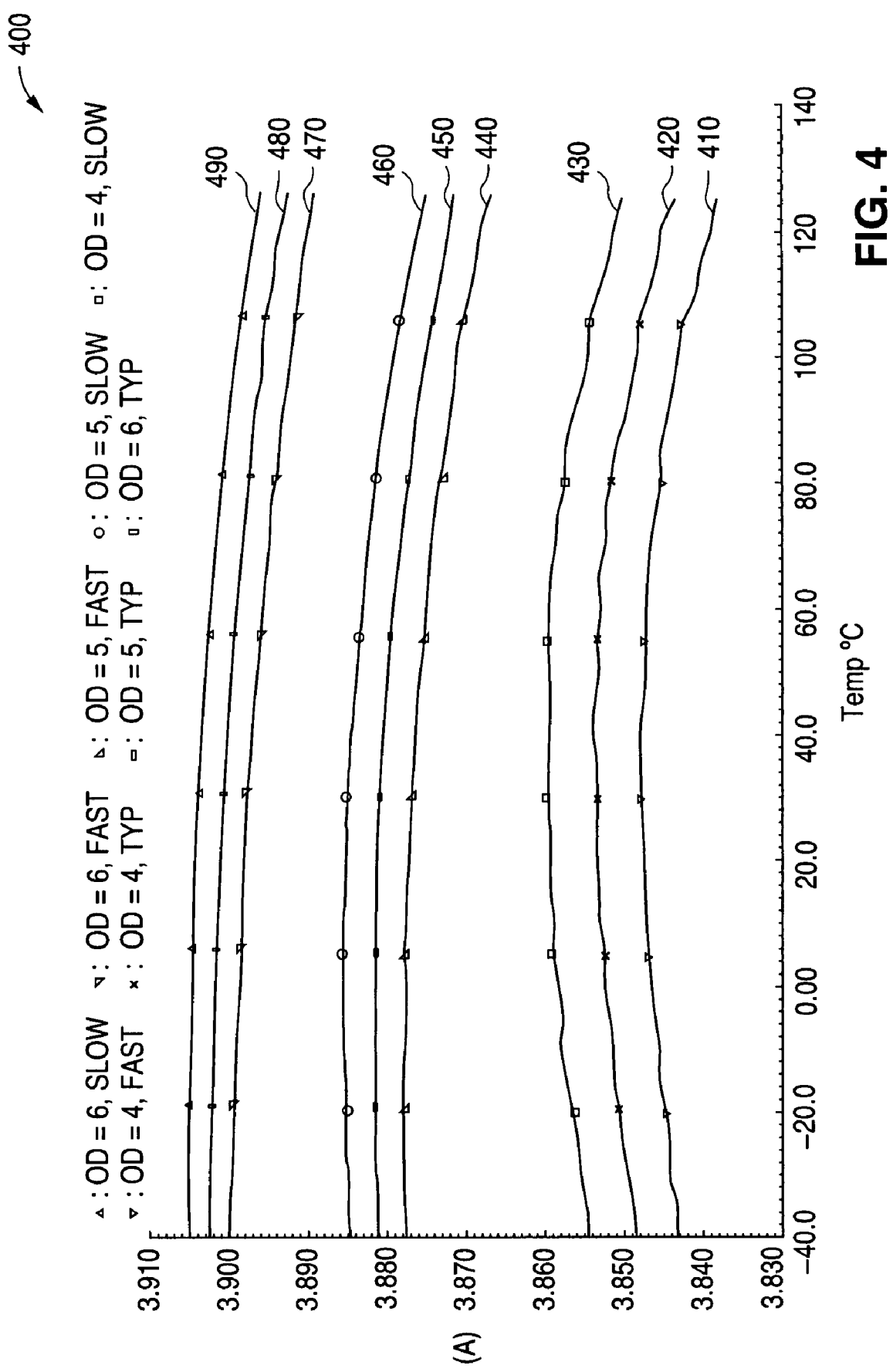
FIG. 4 illustrates a graph of current versus temperature showing simulation results for the current sense and current limit circuit of the present invention shown in FIG. 3 for a range of different over-drive voltages.

FIGS. 3 and 4, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged current sense and current limit device.

FIG. 3 illustrates a schematic diagram of a current sense and current limit circuit 300 of the present invention. The current sense and current limit circuit 300 of the present invention solves the problem of the wide variation of the current limit trip value over variable conditions of process, temperature and over-drive voltage.

Circuit 300 of the present invention comprises a level shifter 310 having an output connected to the input of a driver 315 as shown in FIG. 3. Level shifter 310 receives an input signal from an IN node. Level shifter 310 and driver 315 both receive a CBOOT signal from a CBOOT node.

The CBOOT node is connected a first side of a first diode 320 (designated D1) and to a first side of a capacitor 325 (designated C1). A second side of the first diode 320 D1 is connected to a first side of a first voltage source 330 (designated V1). The second side of the first voltage source 330 is connected to ground.

Level shifter 310 and driver 315 both receive an SW signal from an SW node. The SW node is connected to a second side of the capacitor 325. The SW node is also connected to a first side of an inductor 335 (designated L). The second side of the inductor 335 is connected to ground. The SW node is also connected to a first side of a second diode 340 (designated D2). A second side of the second diode 340 is connected to ground.

Figure 1:
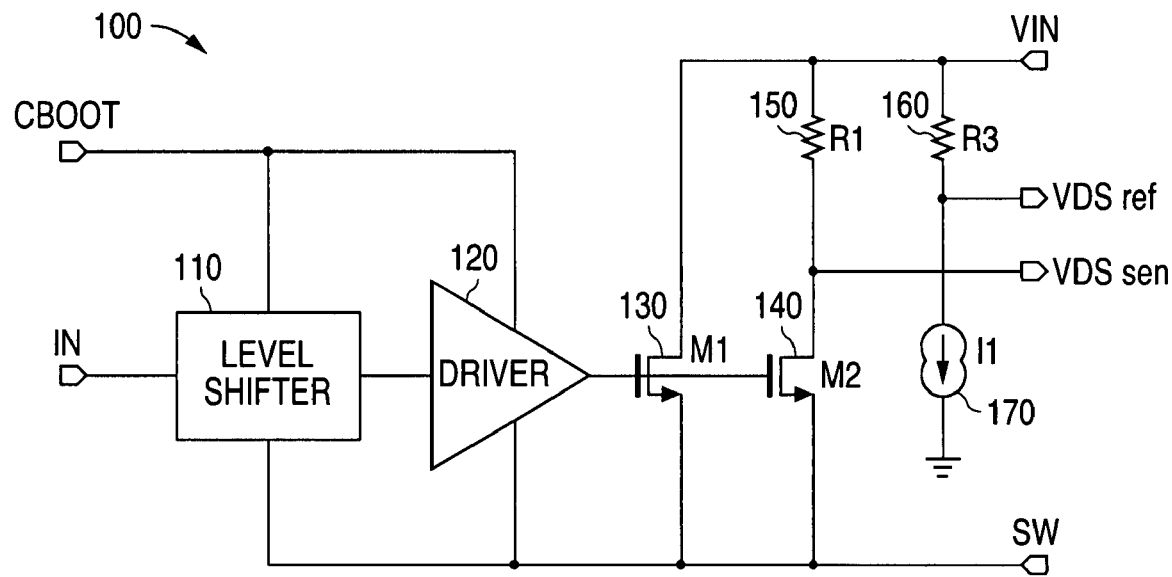
FIG. 1 illustrates a schematic diagram of a prior art current sense and current limit circuit.
Figure 2:
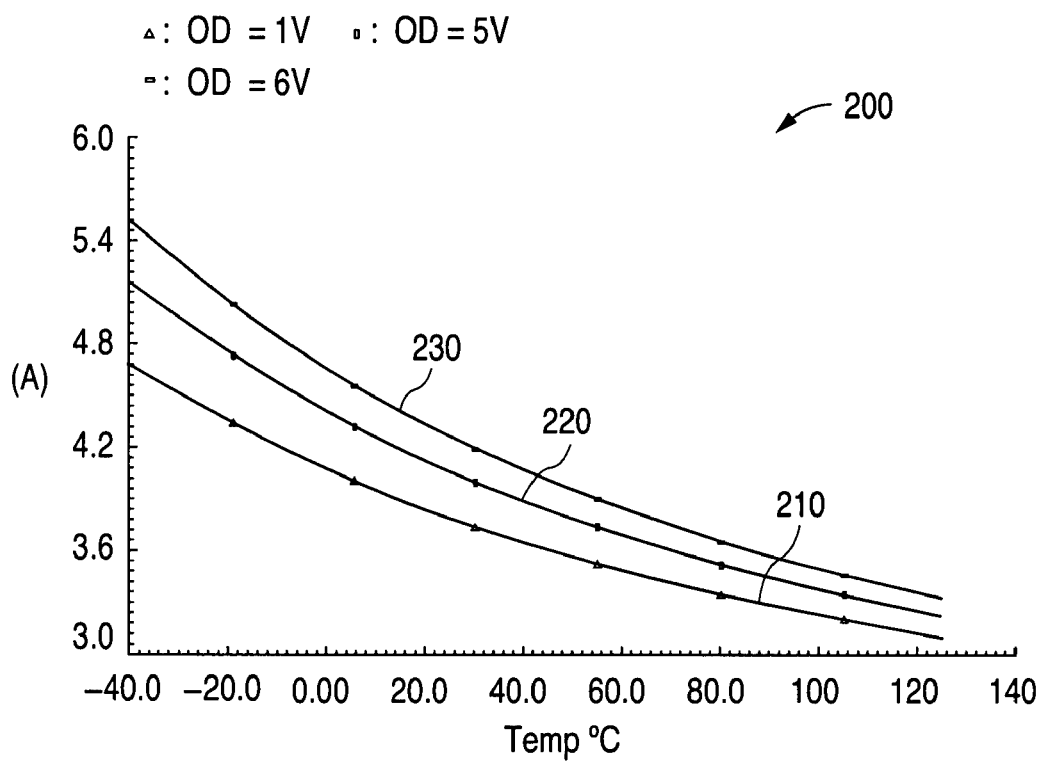
FIG. 2 illustrates a graph of current versus temperature showing simulation results for the prior art current sense and current limit circuit shown in FIG. 1 for a range of different over-drive voltages.

The output of driver 315 is connected to the gate of an n-channel transistor 345 (designated MN4) and to the gate of an n-channel transistor 350 (designated MN5). Transistor 350 MN5 is a high-side Power Field Effect Transistor (FET). Transistor 350 MN5 is sometimes referred to as power transistor 350 MN5. Transistor 345 MN4 is a sense Field Effect Transistor (FET) that has a much smaller size than transistor 350 MN5. For example, a typical width of the power transistor 350 MN5 is ten thousand microns (10K μ) and a typical width of the sense transistor 345 MN4 is ten microns (10μ). Transistor 350 MN5 in FIG. 3 is analogous to transistor 130 M1 in FIG. 1. Transistor 345 MN4 in FIG. 3 is analogous to transistor 140 M2 shown in FIG. 1.

As shown in FIG. 3, the drain of transistor 350 MN5 is connected to the input voltage node VIN that supplies the input voltage $V_{IN}$. The VIN node is connected to a first side of a second voltage source 355 (designated V2). The second side of the second voltage source 355 is connected to ground. The source of transistor 350 MN5 is connected to the SW node.

The drain of transistor 345 MN4 is connected to a source of an n-channel transistor 360 MN2 and to a sense "drain to source voltage" node (designated "VDS sen" in FIG. 3). The source of transistor 345 MN4 is connected to the SW node. The drain of transistor 360 MN2 is connected to the input voltage node VIN. Transistor 360 MN2 in FIG. 3 is analogous to current sense resistor 150 R1 in the prior art circuit 100 shown in FIG. 1. Transistor 360 MN2 will sometimes be referred to as current sense transistor 360 MN2.

Circuit 300 also comprises an n-channel transistor 365 (designated MN1) and an n-channel transistor 370 (designated MN3). A typical width of transistor 365 MN1 is ten microns (10μ). A typical width of transistor 370 MN3 is also ten microns (10μ). The source of transistor 370 MN3 is connected to a reference "drain to source voltage" node (designated "VDS ref" in FIG. 3). The source of transistor 370 MN3 is also connected to a first side of a current source 375 (designated Iref). The second side of the current source 375 is connected to ground.

The "VDS ref" node is connected to a non-inverting input of a current limit comparator circuit 380. The "VDS sen" node is connected to an inverting input of the current limit comparator circuit 380. The output of the current limit comparator circuit 380 provides the current limit trip value. The output of the current limit comparator circuit 380 is connected to the current limit trip value output node (designated "CNT_LIMIT" in FIG. 3).

The drain of transistor 370 MN3 is connected to a source of transistor 365 MN1. The drain of transistor 365 MN1 is connected to the input voltage node VIN. Transistor 370 MN3 and transistor 365 MN1 in FIG. 3 are analogous to current reference resistor 160 R3 in the prior art circuit 100 shown in FIG. 1. Transistor 370 MN3 and transistor 365 MN1 will sometimes be referred to as current reference transistor 370 MN3 and current reference transistor 365 MN1.

The drain of transistor 365 MN1 is also connected to a first end of a resistor 385 (designated R1). A typical value of resistance for the resistor 385 R1 is ten thousand ohms (10 kΩ). The second end of resistor 385 R1 is connected to a source of a p-channel transistor 390 (designated M1). The drain of the transistor 390 M1 is connected to the CBOOT node. The gate of the transistor 390 M1 is connected to the input voltage node VIN. The second end of resistor 385 R1 is also connected to the gate of transistor 365 MN1 and to the gate of transistor 360 MN2 and to the gate of transistor 370 MN3.

The length of the transistor 365 MN1 and the length of the transistor 350 MN5 are the same. The size of the transistor 365 MN1 and the size of the transistor 370 MN3 are the same.

The operation of circuit 300 of the present invention will now be described. When the input signal IN is high, then transistor 350 MN5 is fully turned on and the voltage on the SW node will be close in value to the voltage on the VIN node. Through the capacitor 325 C1, the voltage on the CBOOT node will be higher in value than the voltage on the on the VIN node. This higher value of voltage on the CBOOT node will then turn on the p-channel transistor 390 M1, and the n-channel transistors 365 MN1, 360 MN2 and 370 MN3. Transistor 365 MN1 and transistor 350 MN5 are in the triode region and have similar over-drive voltage.

The voltage drop across the drain and source of the transistor 350 MN5 (designated $V_{DS5}$) is given by the expression:

$$V_{DS5} \cong I_O R_{DSON5} \qquad \text{Eq. (8)}$$

In Equation (8) the expression $I_O$ represents the load current and the expression $R_{DSON5}$ represents the drain to source resistance of the power transistor 350 MN5.

The voltage drop $V_{DS2}$ across the drain and source of the current sense transistor 360 MN2 is given by the expressions:

$$V_{DS2} = V_{IN} - V_{VDS\,sen} \qquad \text{Eq. (9)}$$

$$V_{DS2} = V_{DS5} \frac{R_{DSON2}}{R_{DSON2} + R_{DSON4}} \qquad \text{Eq. (10)}$$

$$V_{DS2} = I_O R_{DSON5} \frac{R_{DSON2}}{R_{DSON2} + R_{DSON4}} \qquad \text{Eq. (11)}$$

The expression $V_{VDSsen}$ represents the sense voltage at the source of the transistor 360 MN2. The expression $V_{DS2}$ represents the drain to source voltage across the transistor 360 MN2. The expression $R_{DSON2}$ represents the drain to source resistance of transistor 360 MN2. The expression $R_{DSON5}$ represents the drain to source resistance of transistor 350 MN5. From Equation (11) one can see that the voltage drop $V_{DS2}$ is proportional to the value of the load current $I_O$.

The reference current passes through transistor 365 MN1 and through transistor 370 MN3. This causes transistor 365 MN1 and transistor 370 MN3 to set the current limit trip value. When the voltage drop across transistor 360 MN2 is greater than the voltage drop across transistor 365 MN1 and transistor 370 MN3, the voltage on the VDSsen node (at the source of transistor 360 MN2) will be lower than the voltage of the VDSref node (at the source of transistor 370 MN3). This will trigger the current limit comparator 380 and the output of the current limit comparator 380 will go high to flag this fault condition.

The current limit will be tripped when the voltage drop across the transistor 360 MN2 is equal to the voltage drop across the transistor 365 MN1 and transistor 370 MN3. This equality condition is expressed as:

$$V_{DSON2} = V_{DSON1} + V_{DSON3} \qquad \text{Eq. (12)}$$

The equality condition leads to the result:

$$I_O R_{DSON5} \frac{R_{DSON2}}{R_{DSON2} + R_{DSON4}} = I_{REF}(R_{DSON1} + R_{DSON3}) \qquad \text{Eq. (13)}$$

The limit value $I_{O(LIMIT)}$ of the load current $I_O$ is:

$$I_{O(LIMIT)} = I_{REF} \frac{(R_{DSON1} + R_{DSON3})}{R_{DSON2}} \frac{(R_{DSON2} + R_{DSON4})}{R_{DSON5}} \quad \text{Eq. (14)}$$

Now assume that all of the transistor devices are operating in the deep triode region. Also assume that transistor 365 MN1 and transistor 370 MN3 are the same size. Then one obtains $$R_{DSON} = \mu \cdot C_{OX} \cdot \frac{w}{L} \cdot V_{OV} \quad \text{Eq. (15)}$$

The term $\mu \cdot C_{OX}$ is a process parameter for the field effect transistors (FETs). The letter L represents the length of the transistor. The expression $V_{OV}$ represents the over-drive voltage. In the current sense and current limit circuit 300 of the present invention the terms $\mu \cdot C_{OX}$ and L and $V_{OV}$ are the same for the transistors MN1 through MN5 (i.e., transistor 365 (MN1), transistor 360 (MN2), transistor 370 (MN3), transistor 345 (MN4), and transistor 350 (MN5)).

The letter "w" represents the width of each respective transistor. The term $w_1$ represents the width of transistor 365 (MN1). The term $w_2$ represents the width of transistor 360 (MN2). The term $w_3$ represents the width of transistor 370 (MN3). The term $w_4$ represents the width of transistor 345 (MN4). The term $w_5$ represents the width of transistor 350 (MN5).

Using the expression set forth in Equation (15), it is possible to simplify Equation (14) to:

$$I_{O(LIMIT)} = I_{REF} \frac{w_2}{0.5w_1} \frac{(w_2 + w_4)}{w_2 w_4} w_5 \quad \text{Eq. (16)}$$

Equation (16) can be further simplified to:

$$I_{O(LIMIT)} = I_{REF} \frac{w_5}{0.5w_1} \frac{(w_2 + w_4)}{w_4} \quad \text{Eq. (17)}$$

From Equation (17) it is seen that the current limit trip value is only related to the widths of transistor 365 MN1, transistor 360 MN2, transistor 345 MN4 and transistor 350 MN5. The current limit trip value is not related to any other factors (e.g., temperature). Because the transistors of the present invention are the same kind of device they have much better matching than the matching in the prior art device 100 (e.g., matching of resistor 150 and resistor 160 with the effective resistance $R_{DSON}$ of transistor 130 M1 and transistor 140 M2).

The current sense and current limit circuit 300 of the present invention provides a substantially constant current limit trip value over variations in process, temperature and over-drive voltages. This feature is illustrated by simulation results shown in FIG. 4.

FIG. 4 illustrates a graph 400 of current versus temperature showing simulation results for the current sense and current limit circuit of the present invention 300 for a range of different over-drive voltages for an ideal current limit of four amperes (4.0 A). As shown in FIG. 4, the temperature ranges from minus forty degrees Celsius (−40° C.) to a positive one hundred degrees Celsius (+140° C.). The current range is from three and eighty three hundredths amperes (3.83 A) to three and ninety one hundredths amperes (3.91 A).

The variation of the current limit trip value as a function of temperature for an overdrive voltage of four volts (4.0 V) is shown in curves 410, 420 and 430. The curve designated 410 represents the variation of the current trip value with respect to temperature for a fast process corner. The curve designated 420 represents the variation of the current trip value with respect to temperature for a typical process corner. The curve designated 430 represents the variation of the current trip value with respect to temperature for a slow process corner.

The variation of the current limit trip value as a function of temperature for an overdrive voltage of five volts (5.0 V) is shown in curves 440, 450 and 460. The curve designated 440 represents the variation of the current trip value with respect to temperature for a fast process corner. The curve designated 450 represents the variation of the current trip value with respect to temperature for a typical process corner. The curve designated 460 represents the variation of the current trip value with respect to temperature for a slow process corner.

The variation of the current limit trip value as a function of temperature for an overdrive voltage of six volts (6.0 V) is shown in curves 470, 480 and 490. The curve designated 470 represents the variation of the current trip value with respect to temperature for a fast process corner. The curve designated 480 represents the variation of the current trip value with respect to temperature for a typical process corner. The curve designated 490 represents the variation of the current trip value with respect to temperature for a slow process corner.

The simulation results illustrated in FIG. 4 show that there is only a one and seven tenths percent (1.7%) variation of the current limit trip value under severe condition variations. These results show that the current sense and current limit circuit of the present invention 300 significantly improves the current limit accuracy under variable operating conditions.

The system and method of the present invention provides a substantially constant value of current limit trip value over a wide variation of operating conditions. The present invention provides a significant improvement in the accuracy of overload protection during variations in temperature, process and over-drive voltage. The current sense and current limit circuitry of the present invention is not complex. Therefore, it will not be necessary to increase design complexity and die size to manufacture the current sense and current limit circuitry of the present invention.

The magnitude of the reference current in the present invention can be made arbitrarily small by adding additional transistors in series with transistor 365 MN1 and transistor 370 MN3. Alternatively, the magnitude of the reference current in the present invention can be made arbitrarily small by increasing the attenuation of transistor 360 MN2 and transistor 345 MN4.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. An over-current protection circuit for providing a substantially constant current limit trip value over variations of at least one variable operating condition, the over-current protection circuit comprising:
   a power transistor;
   a sense transistor;
   at least one current sense transistor connected to the sense transistor;
   at least one current reference transistor connected to the at least one current sense transistor;
   a resistor connected to the at least one current reference transistor; and
   an additional transistor connected to the resistor, the at least one current sense transistor, and the at least one current reference transistor;
   wherein a gate of the at least one current sense transistor is connected to a gate of the at least one current reference transistor;
   wherein the additional transistor is configured to receive a first supply voltage and has a gate configured to receive a second supply voltage; and
   wherein the power transistor, the at least one current sense transistor, the at least one current reference transistor, and the resistor are configured to receive the second supply voltage.

2. The over-current protection circuit as claimed in claim 1, wherein the at least one variable operating condition comprises a temperature operating condition, an over-drive voltage operating condition, and a process operating condition.

3. The over-current protection circuit as claimed in claim 1, wherein the power transistor, the sense transistor, the at least one current sense transistor, and the at least one current reference transistor have a same value of a process parameter $\mu \cdot C_{OX}$, a same value of over-drive voltage, and a same value of length.

4. The over-current protection circuit as claimed in claim 1, wherein a width of the power transistor is approximately ten thousand microns, and a width of the sense transistor is approximately ten microns.

5. The over-current protection circuit as claimed in claim 1, further comprising:
   a first voltage source configured to provide the first supply voltage; and
   a second voltage source configured to provide the second supply voltage.

6. The over-current protection circuit as claimed in claim 1, wherein the current limit trip value of the over-current protection circuit is dependent on a width of the power transistor, a width of the sense transistor, a width of the at least one current sense transistor, and a width of the at least one current reference transistor.

7. The over-current protection circuit as claimed in claim 6, wherein the current limit trip value of the over-current protection circuit without any external device is not dependent on a temperature operating condition, an over-drive voltage operating condition, and a process operating condition.

8. The over-current protection circuit as claimed in claim 1, further comprising a current limit comparator having a first input connected to the at least one current sense transistor and having a second input connected to the at least one current reference transistor.

9. The over-current protection circuit as claimed in claim 8, wherein the current limit comparator is configured to receive on the first input a drain to source voltage signal from a source of the at least one current sense transistor and to receive on the second input a drain to source voltage signal from a source of the at least one current reference transistor.

10. The over-current protection circuit as claimed in claim 9, wherein the current limit comparator is configured to output the current limit trip value.

11. The over-current protection circuit as claimed in claim 1, wherein a magnitude of a reference current through the at least one current reference transistor is made smaller by adding additional current reference transistors in series with the at least one current reference transistor.

12. The over-current protection circuit as claimed in claim 1, wherein the first supply voltage has a higher voltage level than the second supply voltage when the power transistor and the sense transistor are turned on.

13. A power supply circuit that comprises:
   a first voltage source configured to provide a first supply voltage;
   a second voltage source configured to provide a second supply voltage;
   an over-current protection circuit configured to provide a substantially constant current limit trip value over variations of at least one variable operating condition, wherein the over-current protection circuit comprises:
     a power transistor connected to the second supply voltage;
     a sense transistor;
     at least one current sense transistor connected to the sense transistor and to the second supply voltage;
     at least one current reference transistor connected to the at least one current sense transistor and to the second supply voltage;
     a resistor connected to the at least one current reference transistor and to the second supply voltage; and
     an additional transistor connected to the resistor, the at least one current sense transistor, and the at least one current reference transistor, the additional transistor also connected to the first supply voltage and having a gate connected to the second supply voltage;
     wherein a gate of the at least one current sense transistor is connected to a gate of the at least one current reference transistor; and
   a driver configured to drive the power transistor and the sense transistor.

14. The power supply circuit as claimed in claim 13, wherein the at least one variable operating condition comprises a temperature operating condition, an over-drive voltage operating condition, and a process operating condition.

15. The power supply circuit as claimed in claim 13, wherein the power transistor, the sense transistor, the at least one current sense transistor, and the at least one current reference transistor have a same value of a process parameter $\mu \cdot C_{ox}$, a same value of over-drive voltage, and a same value of length.

16. A method of providing over-current protection for a circuit, the method comprising the steps of:
   providing an over-current protection circuit that comprises:
     a power transistor;
     a sense transistor;
     at least one current sense transistor connected to the sense transistor;
     at least one current reference transistor connected to the at least one current sense transistor;
     a resistor connected to the at least one current reference transistor; and an additional transistor connected to the resistor, the at least one current sense transistor, and the at least one current reference transistor;

wherein a gate of the at least one current sense transistor is connected to a gate of the at least one current reference transistor;

wherein the additional transistor receives a first supply voltage and has a gate that receives a second supply voltage; and wherein the power transistor, the at least one current sense transistor, the at least one current reference transistor, and the resistor receive the second supply voltage;

generating in the over-current protection circuit a substantially constant current limit trip value over variations of at least one variable operating condition; and detecting when the substantially constant current limit trip value has been exceeded.

17. The method as claimed in claim 16, wherein the at least one variable operating condition comprises a temperature operating condition, an over-drive voltage operating condition, and a process operating condition.

18. The method as claimed in claim 17, further comprising the step of:
  determining the substantially constant current limit trip value of the over-current protection circuit without any external device using a width of the power transistor, a width of the sense transistor, a width of the at least one current sense transistor, and a width of the at least one current reference transistor.

19. The method as claimed in claim 18, wherein the step of determining the substantially constant current limit trip value is not dependent on a temperature operating condition, an over-drive voltage operating condition, and a process operating condition.

* * * * *